United States Patent [19]
Stadler et al.

[11] Patent Number: 6,079,207
[45] Date of Patent: Jun. 27, 2000

[54] MOTOR VEHICLE ACTUATING UNIT

[75] Inventors: Brün-Friedrich Stadler, Karben; Harald König, Ober-Mörlen; Peter Böhm, Friedrichsdorf; Klaus Bergelin, Niedernhausen; Albin Löw, Karben; Gilbert Bischoff, Hattersheim, all of Germany

[73] Assignee: ITT Manufacturing Enterprises, Inc., Wilmington, Del.

[21] Appl. No.: 08/894,846

[22] PCT Filed: Feb. 23, 1996

[86] PCT No.: PCT/EP96/00759

§ 371 Date: Feb. 19, 1999

§ 102(e) Date: Feb. 19, 1999

[87] PCT Pub. No.: WO96/26086

PCT Pub. Date: Aug. 29, 1996

[30] Foreign Application Priority Data

Feb. 24, 1995 [DE] Germany ............................ 195 06 607

[51] Int. Cl.[7] ....................................................... F15B 7/00
[52] U.S. Cl. ............................................. 60/533; 60/547.1
[58] Field of Search .................................. 60/533, 547.1, 60/554

[56] References Cited

U.S. PATENT DOCUMENTS

| 4,410,212 | 10/1983 | Sturtz ................................. 180/271 X |
| 5,634,337 | 6/1997 | Gautier et al. ........................... 60/554 |
| 5,797,264 | 8/1998 | Verbo et al. .......................... 60/547.1 |
| 5,890,358 | 4/1999 | Verbo et al. ............................. 60/533 |
| 5,927,821 | 7/1999 | Bauer et al. ......................... 60/554 X |

FOREIGN PATENT DOCUMENTS

| 20 13 638 | 7/1971 | Germany . |
| 2947657 | 7/1981 | Germany ............................ 60/547.1 |
| 44 15 642 | 12/1994 | Germany . |
| 2 031 814 | 4/1980 | United Kingdom ..................... 60/533 |
| 2085105 | 4/1982 | United Kingdom ................. 60/547.1 |
| 2 230 493 | 10/1990 | United Kingdom ..................... 60/533 |

Primary Examiner—John E. Ryznic
Attorney, Agent, or Firm—Rader, Fishman & Grauer PLLC

[57] ABSTRACT

According to the present invention, the master cylinder of a motor vehicle actuating unit has a bipartite flange, and one part of the flange is provided as a mounting plate which is guided on a spherical bead shaped on the master cylinder. The mounting plate clamps the master cylinder in relation to the wall of a brake force booster. This ensures that the master cylinder may escape or may be deflected in a rearward direction in the case of a crash, without transmitting an excessively large amount of force to the wall of the brake force booster.

22 Claims, 2 Drawing Sheets

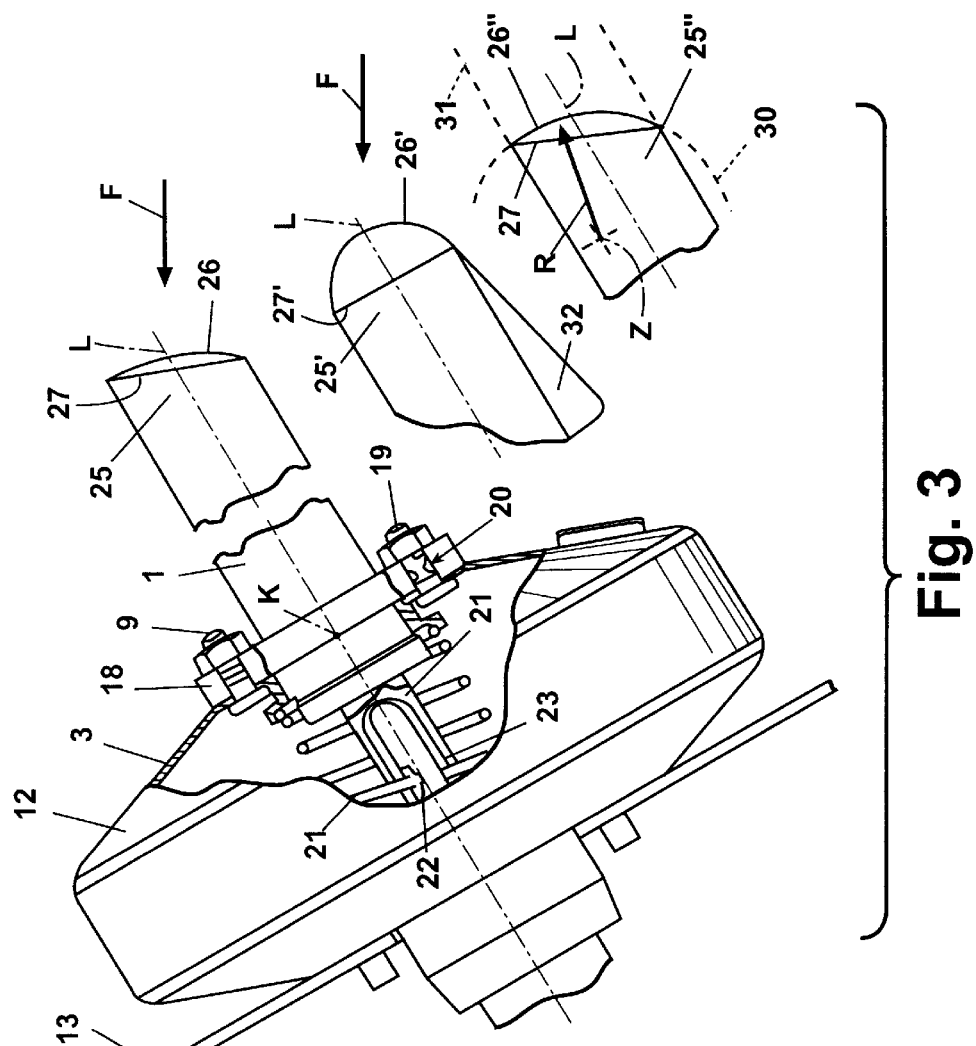
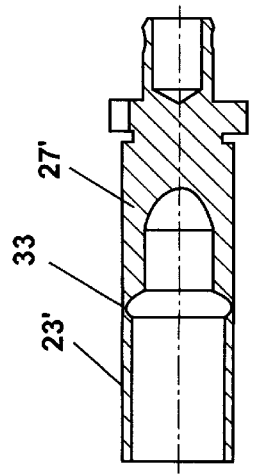
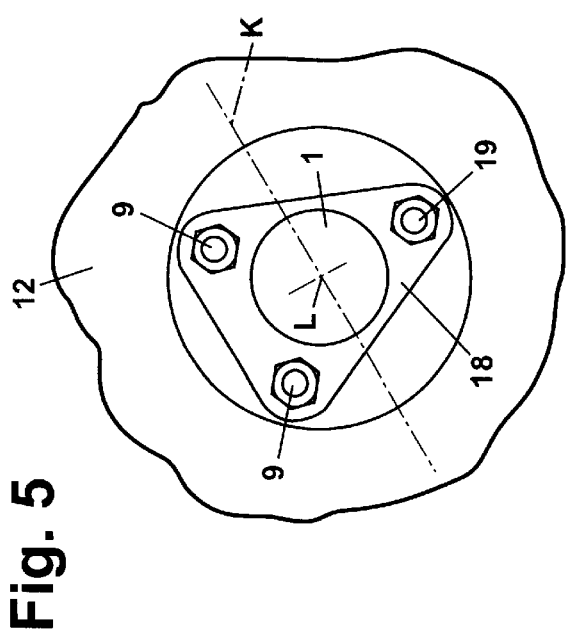
Fig. 3
Fig. 4
Fig. 5

MOTOR VEHICLE ACTUATING UNIT

BACKGROUND OF THE INVENTION

The present invention relates to a motor vehicle actuating unit including a master cylinder which is attached to a wall in the motor vehicle.

In particular in crashes which cause deformations to the front part of the motor vehicle, there is the risk that parts which are positioned in this area, in particular the actuating unit of the hydraulic brake system located at the splashboard, will reduce the space available directly in front of the driver so that injuries are imminent. Therefore, German patent No. 43 04 565, for example, discloses the provision of means which simulate increased fluid requirements of the brake system in a crash with deformations at the front part of the motor vehicle and, thus, permit extending the actuating travel of the actuating unit. Hydraulic valves are provided in this arrangement which must be operated in the case of a crash to achieve the desired effect.

A disadvantage of this known arrangement is that relatively high demands must be placed on the valves because they must function correctly and quickly in the case of a crash, but remain unoperated in the normal case, usually for years.

SUMMARY OF THE INVENTION

Therefore, an object of the present invention is to disclose a motor vehicle actuating unit which is appropriate to reduce by simple means the risk of injury in the passenger compartment of the motor vehicle when a crash occurs.

According to the present invention, this object is achieved by the provision of means which permit a deflecting movement of the master cylinder from its longitudinal axis in a crash causing deforming impacts on the front part of the motor vehicle. Because a deflecting movement of this type is effected to a large extent without force being transmitted to the wall, component parts which are inserted in front of the master cylinder in the direction of the passenger compartment will not intrude into the passenger compartment, or only to a very small degree. This minimizes the risk of injuries in the leg room. A deflecting movement of this type can be achieved by low-cost passive measures.

The wall can be the splashboard of the motor vehicle or the front wall of a brake force booster. The master cylinder can be mounted in a hydraulic brake system or for the clutch actuation, for example.

Preferably, the master cylinder is attached to the wall by a fastening element made up of two parts which permit a tilting movement relative to each other in the event that forces caused by a crash act on the master cylinder.

Favorably, the two-part fastening element is made up of a bead which is arranged on the master cylinder and abuts on the wall, on the one hand, and on a mounting plate, on the other hand. The mounting plate forms the other part of the flange. The bead is rigidly connected to the master cylinder, and the mounting plate is attached to the wall, by screws, for example. The advantage is that the mounting plate, exactly as the conventional flange of a master cylinder, can be attached to the wall, in particular the wall of a hydraulic brake force booster, without the need for special modifications of the wall.

Thus, the actuating unit according to the present invention can be adapted with simple means to achieve an accident-proof actuating unit. Such an adaption includes slight modifications to the fastening element of the master cylinder and maintaining a conventional brake force booster. It is also possible to make the wall of the brake force booster thinner in part. This facilitates the deflecting movement and still further reduces the amount of displacement of the brake force booster into the passenger compartment.

It is especially favorable that the bead has the shape of a circular segment, as viewed in a longitudinal cross-section of the master cylinder, and the mounting plate has a matingly shaped hollow chamber, against which the bead bears, in its front area which is remote from the wall. The hollow chamber is spaced from the bead in the rear area. The curved surfaces of the bead and the mounting plate which abut each other form sort of a swivel joint, and the rear area permits a deflecting movement of the master cylinder in the direction of the wall, with the wall yielding to deformation. The bead may have the shape of a spherical zone or the shape of a radially projecting cylindrical ring.

Further, according to the present invention, the mounting plate by which the master cylinder is fastened to the wall is mounted on the wall by differently stable connections. During a crash, an asymmetical connection of this type is subjected to uneven amounts of load and, therefore, will deflect more easily. The asymmetry can be produced because the mounting plate is fixed by screws at two locations, and one of the screws has a strong and the other one a weak design. However, it is also possible to distribute the screws unevenly over the periphery. It is self-explanatory that other suitable connections beside screws can also be used.

In general, there is a preferred deflection axis about which the master cylinder shall tilt in a deflecting movement during a crash. A preferred deflection axis of this type can be predetermined, for example, by the predefined geometry or the arrangement of the aggregates in the vehicle engine compartment. A detachable connection of the mounting plate to the wall is provided below the preferred deflection axis which is detached already by the action of low force and thereby permits tilting of the master cylinder about the deflection axis. It is generally preferred that the master cylinder is deflected in an upward direction because master cylinders are mostly so arranged that they are inclined slightly upwardly. Thus, in a frontal impact, the master cylinders tend to be deflected in an upward direction anyway. However, a lateral deflecting movement (for example, to prevent destruction of a reservoir positioned above the master cylinder) or a downward deflecting movement is also possible, and the detachable connection must be arranged accordingly laterally of or above the deflection axis.

The detachable connection can be a catch-type or clamping connection, for example. Preferably, however, a screw having a preset breaking point is used because the screw can be rated relatively exactly to a desired nominal load capacity.

When the master cylinder is positioned horizontally in the vehicle, or with a slight inclination only, according to the present invention, it will be provided with one or a plurality of force-receiving contours on which component parts may abut which are displaced during a crash in the direction of the master cylinder. The desired deflecting movement of the master cylinder is assisted by the shape of the contour.

Favorably, an inclined contact surface is provided to this end, and the impact force, due to the inclined surface, acts as a torque which tilts the master cylinder from its longitudinal axis. The contact surface is preferably provided at the front end of the master cylinder. In particular, the front end surface, which is generally vertical to the axis of the master cylinder, can be tilted with respect to the preferred deflection axis. It is also possible, however, to place correspondingly inclined surfaces at other locations of the master cylinder, for example, laterally.

The contact surface according to the present invention may be plane or curved, and the curvature may be cylindrical or spherical. The curvature prevents components, such as a battery, which strike against the contact surface from getting damaged, and a plane surface permits a favorable force transmission.

Further features and advantages of the present invention can be seen in the following description of two embodiments making reference to the accompanying drawings.

BRIEF DESCRIPTION OF THE DRAWINGS

In the drawings,

FIG. 3 is a second embodiment of the motor vehicle actuating unit, according to the present invention, in the normal condition.

FIG. 4 is a cross-sectional view of an embodiment of a cylinder piston according to the present invention having a preset breaking point.

FIG. 5 is another embodiment, similar to FIG. 3, in a view from the right in the direction of the longitudinal axis L.

DETAILED DESCRIPTION OF THE DRAWINGS

Figure 1:
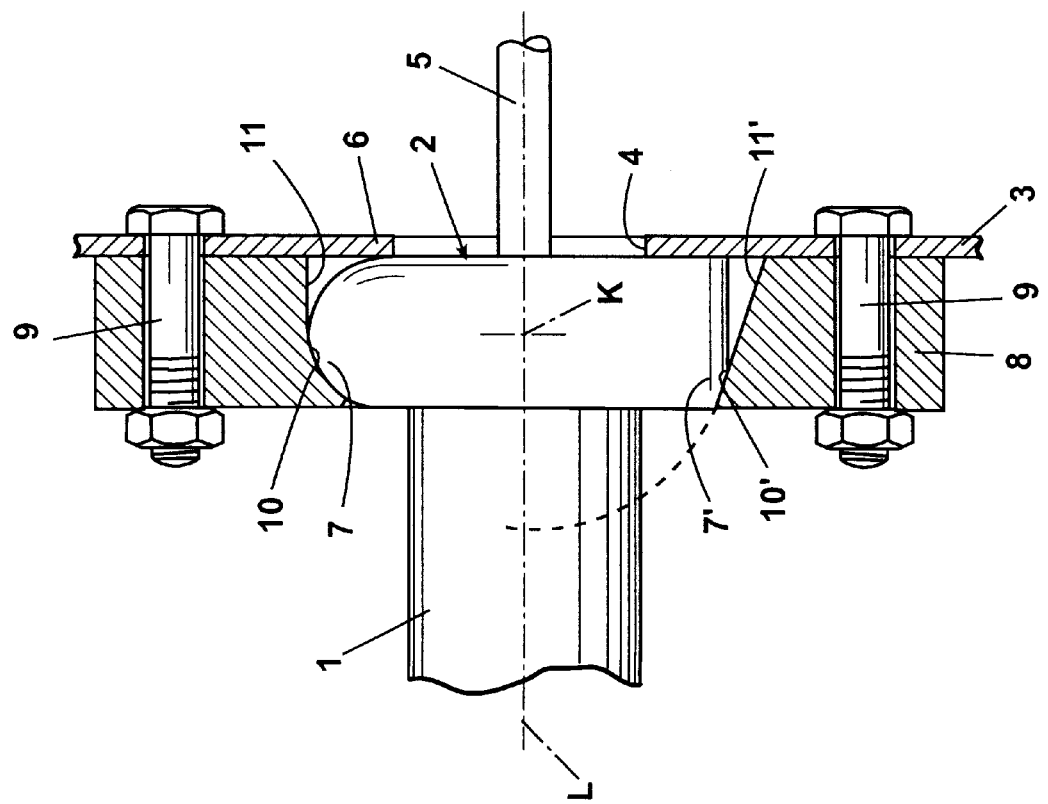
FIG. 1 is a first embodiment of the motor vehicle actuating unit, according to the present invention, in the normal condition.

FIG. 1 shows a master cylinder 1, illustrated only in part and schematically, which bears with a circumferential bead 2 against a wall 3. An actuating rod 5 to actuate the master cylinder 1 extends through an opening 4 in the wall 3. The diameter of the opening 4 is rated so that an annular area 6 of wall 3 which abuts on the bead 2, is sufficiently stable but, nevertheless, relatively easily deformable in the case of a crash. This is explained in more detail with respect to FIG. 2. A part 7 of the bead 2 which projects from the master cylinder 1 has the shape of a circle segment in the projection in the drawing plane. In the bottom half of FIG. 1, the bead is provided as a spherical zone 7', and the imaginary further course of the ball is dotted. It is clear that two alternative embodiments are referred to herein.

The mounting plate 8 is fastened to the wall 3 by two screws 9 and has a curved abutment surface 10 in the front area, which is on the left in the drawing. The abutment surface 10 of mounting plate 8 abuts on the bead 2 and passes over into a cylindrical surface 11 spaced from the bead 2, as shown in the upper half of FIG. 1.

An abutment surface 10' shown in the bottom half of FIG. 1 abuts correspondingly on the spherical zone 7' and passes over into a truncated-cone-shaped area 11'.

When, during a crash, a force is applied to the master cylinder 1 in the direction of its longitudinal axis L, the bead 2 will deform the entire annular area 6 and will displace to the right, without transmitting a large amount of force to the wall 3. An application of force exactly in the direction of the axis L is extremely unlikely in reality. Generally, force is applied in a slightly inclined fashion, especially because master cylinders are typically positioned in the vehicle so as to be already inclined slightly upwardly. The master cylinder 1 then performs a tilting movement about a tilting axis K which is disposed approximately vertically to its longitudinal axis L.

Figure 2:
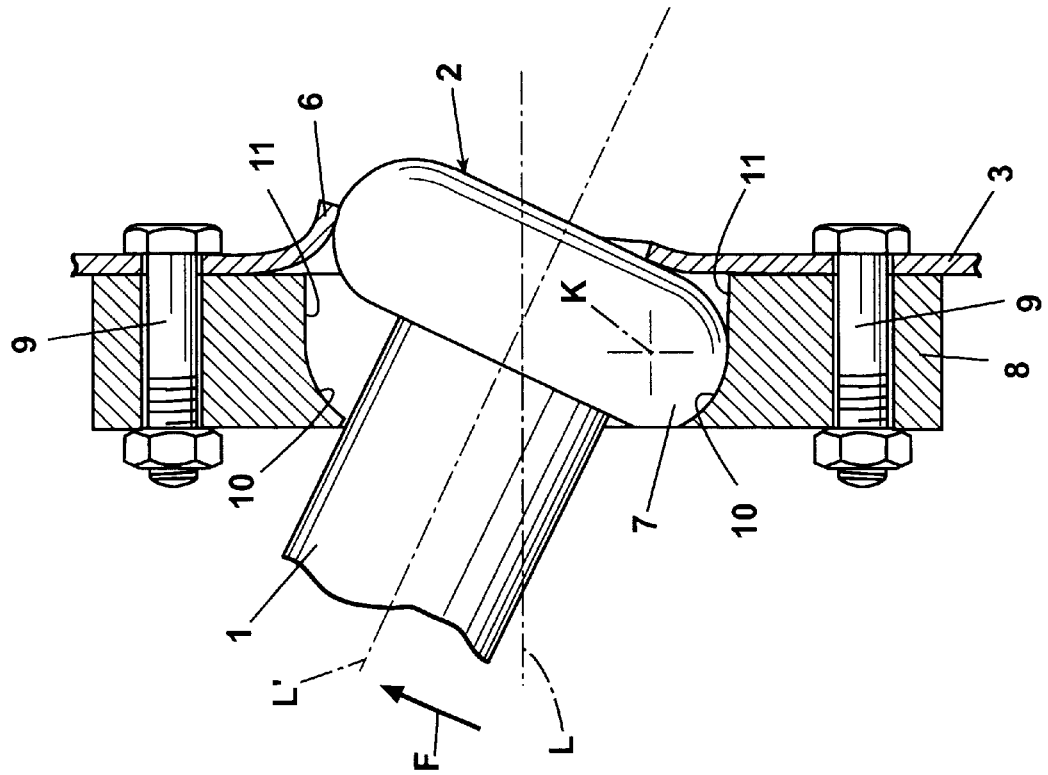
FIG. 2 is the motor vehicle actuating unit of FIG. 1 during a crash.

It is shown in FIG. 2 how a force F, acting at an inclination relative to the longitudinal axis L, tilts the master cylinder 1. The force F acts from downward, with the result that a torque is applied to the master cylinder 1. The abutment surface 10 of the mounting plate 8 and the surface of the part 7 form sort of a spherical joint about which the master cylinder 1 can tilt. In the top area of FIG. 2, the annular area 6 yields due to the lever effect of the bead 2 and permits a deflecting movement of the master cylinder 1. Thus, the master cylinder 1 will tilt in an upward direction, with the result that the axial extension of the actuating unit is decreased and, in addition, a correspondingly deep intrusion into the area behind the wall 3 is prevented.

In order that not only the surface pressure between the abutment surfaces 10, 10' and the spherical zones 7, 71 acts so as to prevent rotation with respect to the axis L of the master cylinder 1, in addition, a shearing element (not shown) may be fitted between the abutment surfaces 10, 10' and the spherical zones 7, 7. For example, designing the shearing element as a shearing pin provides a simple solution.

FIG. 3 shows a second embodiment of a motor vehicle actuating unit according to the present invention including a master cylinder 1 which is attached to the wall 3 of a brake force booster 12 which, in turn, is attached to the splashboard 13 of a motor vehicle. The brake force booster 12 is shown in a partial cross-section, just as the mounting plate 18 which is rigidly connected to the master cylinder 1. The mounting plate 18 is attached to the wall 3 by two screws 9, 19. Screw 19 has a preset breaking point 20. A force F which acts at an inclination relative to the longitudinal axis L of the master cylinder 1 causes breaking of the screw 19 at the preset breaking point 20 and, thus, permits tilting of the master cylinder 1 about the tilting axis K. Instead of a preset breaking point 20, a screw 19 with a completely smaller diameter or a screw made of a low-strength material may be used.

To operate the master cylinder 1, a stem 21 of a piston guided in the master cylinder 1 projects from the backward area of the master cylinder 1. An actuating rod 22 makes catch in the stem 21. To facilitate tilting of the master cylinder 1 during a crash, the stem 21 is thin walled in its end area 23. An alternative embodiment is described in connection with FIG. 4. During tilting of the master cylinder 1, the end area can deform easily when it comes into contact with the actuating rod 22. In addition, the actuating rod 22 may include a preset breaking point 24, shown in dash-dot lines only, to further facilitate the deflecting movement of the master cylinder 1.

The front end 25 of the master cylinder 1, which is not shown in the drawing in full length, includes a contact surface 26 which is arranged generally at an inclination relative to the longitudinal axis L and has a slight curvature. The illustrated contact surface 20 has the form of a spherical ball which is fitted to an imaginary inclined end surface 27 of the front end 25.

As a first alternative, FIG. 3 also shows the front end 25' which includes a generally semispherical contact surface 26' that is arranged in an end surface 27' disposed vertically on the longitudinal axis L. Further, the end 25' may additionally include a portion 32 which facilitates the deflecting movement of the master cylinder 1 still more. In FIG. 3, the portion 32 is configured as a ramp 32 which tapers radially towards the front end 25'. Ramp 32 is provided at a point on the periphery of the master cylinder 1 which is appropriate to aid in the desired direction of deflection.

As a second alternative of designing the front end of the master cylinder 1, FIG. 3 also shows a front end 25" which includes a contact surface 26". The contact surface 26" corresponds to the area of an imaginary cylinder 30 having a radius R, the axis Z of which is vertical to the longitudinal axis L but does not necessarily intersect it, and which is disposed within an imaginary extension of the peripheral surface 31 of the master cylinder 1. The imaginary parts such as cylinder 30, peripheral surface 31 and radius R are shown in dotted lines in FIG. 3.

FIG. 4 shows a cross-sectional view of another embodiment of the master cylinder piston according to the present invention. In this alternative embodiment, the piston stem 21' extending into the actuating rod 22 has at least one preset breaking point 31. The preset breaking point 31 is preferably a groove having a radius of roughly 1.5 mm. Of course, other notch shapes are also possible, and the accurate shape of the preset breaking groove 31 is a compromise between the stability of the piston and the desired resilience. It is also possible, however, to insert, instead of a groove 31, several grooves lying one behind the other in the piston stem 21', with the result that the resilience is further increased. Due to the preset breaking point 31 shown in FIG. 4, the end portion 23' of stem 21' can have thicker walls compared to the former embodiment. This is a special advantage because it is difficult and, hence, costly to manufacture extremely thin-walled parts.

FIG. 5 shows a view of the master cylinder 1 in the direction of the axis L. It can be seen that the mounting plate 18, in contrast to FIG. 3, is attached above the tilting axis K by two screws 9 to the brake force booster 12, shown in part only. Only one screw 19 is provided below the axis K which can be furnished with or without a preset breaking point.

According to the present invention, the master cylinder 1 can include a two-part flange, and part of the flange is configured as a mounting plate 8 which is guided on a ball-segment-shaped bead 2 shaped on the master cylinder 1. The mounting plate 8 clamps the master cylinder 1 relative to the wall 3 of a brake force booster. This ensures that the master cylinder 1 can escape or deflect in a rearward direction during a crash without transmitting an excessively great force to the wall 3 of the brake force booster.

Deformation of the splashboard 13 in a frontal impact is prevented by the present invention because the force which is applied by the master cylinder 1 and, possibly, the brake force booster 12 to the splashboard 13 or the wall 3, is removed by a predetermined force-receiving contour at the front end 25 of the master cylinder, whereby a deflecting movement of the master cylinder 1 is initiated in time. This deflecting movement is assisted passively by a preset breaking point 20 and a thin-walled design of the stem 21.

We claim:

1. An actuating unit for a motor vehicle, comprising:
   a master cylinder with a longitudinal axis, wherein the master cylinder is attached to a wall of the motor vehicle,
   means for permitting a deflecting movement of the master cylinder from its longitudinal axis in a crash wherein the master cylinder is attached to said wall in said motor vehicle.

2. The actuating unit as claimed in claim 1, wherein the fastening element is made up of a bead which is arranged on the master cylinder and a mounting plate, and wherein the bead abuts the wall of said motor vehicle, and the mounting plate.

3. The actuating unit as claimed in claim 2, wherein the bead has the shape of a circular segment.

4. The actuating unit as claimed claim 2, wherein the bead is connected to the mounting plate by way of a shearing element.

5. The actuating unit as claimed claim 1, wherein the master cylinder is attached to the wall of the motor vehicle by way of a mounting plate having connecting points with the wall.

6. The actuating unit as claimed in claim 5, wherein two screw connections are arranged above a preferred deflection axis which is disposed vertically to the longitudinal axis of the master cylinder, and a detachable connection is arranged below the deflection axis.

7. The actuating unit as claimed in claim 6, wherein the detachable connection is provided by a screw having a preset breaking point.

8. The actuating unit as claimed in claim 1, wherein the master cylinder includes a force-receiving contour.

9. The actuating unit as claimed in claim 8, wherein the force-receiving contour is configured as a portion which tapers radially towards the front end of the master cylinder.

10. The actuating unit as claimed in claim 8, wherein the force-receiving contour is an inclined contact surface.

11. The actuating unit as claimed in claim 8, wherein the force-receiving contour is a curved contact surface.

12. The actuating unit as claimed in claim 11, wherein the contact surface has a cylindrical design.

13. The actuating unit as claimed in claim 11, wherein the contact surface has a spherical design.

14. The actuating unit as claimed in claim 1, wherein the master cylinder includes an actuating rod, and wherein said master cylinder is operable by said actuating rod guided in a stem of a piston, wherein the stem has at least one preset breaking point.

15. The actuating unit as claimed in claim 1, wherein the master cylinder includes an actuating rod, and wherein said master cylinder is operable by said actuating rod guided in a stem of a piston, and wherein stem has a thin-walled design.

16. The actuating unit as claimed claim 1, wherein the master cylinder includes an actuating rod, and wherein said master cylinder is operable by said actuating rod guided in a stem of a piston, wherein the actuating rod has a preset breaking point.

17. An actuating unit for a motor vehicle, comprising:
   a master cylinder with a longitudinal axis,
   means for attaching the master cylinder to a wall of the motor vehicle,
   means for permitting a deflecting movement of the master cylinder from its longitudinal axis in a crash wherein the master cylinder includes a force-receiving contour,
   wherein the force-receiving contour is a curved contact surface.

18. The actuating unit as claimed in claim 17, wherein the contact surface has a cylindrical design.

19. The actuating unit as claimed in claim 17, wherein the contact surface has a spherical design.

20. The actuating unit as claimed in claim 17, wherein the master cylinder is operable by an actuating rod guided in a stem of a piston, and the stem has at least one preset breaking point.

21. The actuating unit as claimed in claim 17, wherein the master cylinder is operable by an actuating rod guided in a stem of a piston, and the stem has a thin-walled design.

22. The actuating unit as claimed claim 17, wherein the master cylinder is operable by an actuating rod guided in a stem of a piston, and the actuating rod has a preset breaking point.

* * * * *